United States Patent
Aoki et al.

(10) Patent No.: US 12,036,582 B2
(45) Date of Patent: Jul. 16, 2024

(54) METHOD FOR PROCESSING ELECTRONIC/ELECTRICAL DEVICE COMPONENT SCRAPS

(71) Applicant: JX METALS CORPORATION, Tokyo (JP)

(72) Inventors: Katsushi Aoki, Hitachi (JP); Hidetoshi Sasaoka, Kitaibaraki (JP); Tsubasa Takeda, Hitachi (JP)

(73) Assignee: JX METALS CORPORATION, Tokyo (JP)

( * ) Notice: Subject to any disclaimer, the term of this patent is extended or adjusted under 35 U.S.C. 154(b) by 193 days.

(21) Appl. No.: 17/599,226

(22) PCT Filed: Mar. 27, 2020

(86) PCT No.: PCT/JP2020/014367
§ 371 (c)(1),
(2) Date: Sep. 28, 2021

(87) PCT Pub. No.: WO2020/203918
PCT Pub. Date: Oct. 8, 2020

(65) Prior Publication Data
US 2022/0176415 A1    Jun. 9, 2022

(30) Foreign Application Priority Data

Mar. 29, 2019   (JP) .................... 2019-069382

(51) Int. Cl.
*B07C 5/36* (2006.01)
*B03B 9/06* (2006.01)
(Continued)

(52) U.S. Cl.
CPC .............. *B07C 5/366* (2013.01); *B03B 9/061* (2013.01); *B07C 5/342* (2013.01); *B09B 3/35* (2022.01); *B07C 2501/0018* (2013.01)

(58) Field of Classification Search
CPC .................... B07C 5/366; B07C 5/342; B07C 2501/0018; B03B 9/061; B03B 9/00;
(Continued)

(56) References Cited

U.S. PATENT DOCUMENTS 4,541,530 A * 9/1985 Kenny .................... B07C 5/344
209/555
7,262,380 B1 * 8/2007 Ulrichsen ............... B07C 5/344
250/225
(Continued)

FOREIGN PATENT DOCUMENTS

JP    9-78151 A    3/1997
JP    10-57927 A   3/1998
(Continued)

OTHER PUBLICATIONS

English translation of the International Preliminary Report on Patentability and Written Opinion of the International Searching Authority (Forms PCT/IB/338, PCT/IB/373 and PCT/ISA/237) for corresponding International Application No. PCT/JP2020/014367, dated Oct. 14, 2021.
(Continued)

*Primary Examiner* — Gene O Crawford
*Assistant Examiner* — Muhammad Awais
(74) *Attorney, Agent, or Firm* — Birch, Stewart, Kolasch & Birch, LLP

(57) ABSTRACT

Provided is a method for processing electronic and electrical device component scrap, which can improve an efficiency of sorting of raw materials fed to the smelting step from electronic and electrical device component scrap, and reduce losses of valuable metals. A method for processing electronic and electrical device component scrap which includes removing powdery objects contained in electronic and electrical device component scrap prior to a step of separating
(Continued)

non-metal objects or metal objects from the electronic and electrical device component scrap containing the metal objects and the non-metal objects, using a metal sorter including: a metal sensor, a color camera, an air valve, and a conveyor.

9 Claims, 3 Drawing Sheets

(51) Int. Cl.
  *B07C 5/342* (2006.01)
  *B09B 3/35* (2022.01)
(58) Field of Classification Search
  CPC .... B09B 3/35; B09B 3/00; B09B 5/00; B09B 2101/17; B09B 2101/15; C22B 7/001; C22B 1/005; C22B 7/005; Y02P 10/20; B07B 1/00; B07B 7/00; B07B 9/00; B07B 9/02; Y02W 30/82
  USPC ................................................... 209/577, 39
  See application file for complete search history.

(56) References Cited

U.S. PATENT DOCUMENTS

| | | | |
|---|---|---|---|
| 7,674,994 B1* | 3/2010 | Valerio | ............... B07C 5/344 209/558 |
| 2007/0262000 A1* | 11/2007 | Valerio | ............... B07C 5/344 209/559 |
| 2011/0049021 A1* | 3/2011 | Valerio | ............... B07C 5/368 209/571 |
| 2021/0017626 A1 | 1/2021 | Aoki et al. | |
| 2021/0039146 A1 | 2/2021 | Aoki et al. | |
| 2021/0107034 A1 | 4/2021 | Aoki et al. | |

FOREIGN PATENT DOCUMENTS

| | | | |
|---|---|---|---|
| JP | 2000-343044 A | | 12/2000 |
| JP | 2002-194448 A | | 7/2002 |
| JP | 2002-263581 A | | 9/2002 |
| JP | 2007-29923 A | | 2/2007 |
| JP | 2007029923 A | * | 2/2007 |
| JP | 2008-142692 A | | 6/2008 |
| JP | 2013-685 A | | 1/2013 |
| JP | 2015-123418 A | | 7/2015 |
| JP | 2018-79459 A | | 5/2018 |
| JP | 2018079459 A | * | 5/2018 |
| JP | 2018-167246 A | | 11/2018 |
| JP | 2019-48282 A | | 3/2019 |
| WO | WO 2012/131906 A1 | | 10/2012 |
| WO | WO 2019/151351 A1 | | 8/2019 |
| WO | WO 2019/177176 A1 | | 9/2019 |
| WO | WO 2019/177177 A1 | | 9/2019 |

OTHER PUBLICATIONS

International Search Report, issued in PCT/JP2020/014367, PCT/ISA/210, dated Jun. 9, 2020.

* cited by examiner

METHOD FOR PROCESSING ELECTRONIC/ELECTRICAL DEVICE COMPONENT SCRAPS

FIELD OF THE INVENTION

The present invention relates to a method for processing electronic and electrical device component scraps. More particularly, it relates to a method for processing electronic and electrical device component scraps suitable for recycling of used electronic and electrical devices.

BACKGROUND OF THE INVENTION

From the viewpoint of recent resource conservation, recovery of variable metals from electronic and electrical device component scrap such as waste electronic home appliances, PCs and mobile phones has increasingly become popular, and an efficient method for recovering the valuable metals has been studied and proposed.

For example, Japanese Patent Application Publication No. H09-78151 A (Patent Literature 1) discloses a recycling method for valuable metals, including the steps of charging scrap containing valuable metals into a flash furnace for smelting copper ores, and recovering the valuable metals into a mat that is retained in the furnace. According to such a recycling method, scrap processing can be combined with a copper smelting step in the copper smelting flash furnace, so that the valuable metals can be recovered at low cost even from scrap having a lower content of the valuable metals.

However, in the processing using the copper smelting flash furnace as disclosed in Patent Literature 1, an increased amount of the electronic and electrical device component scrap processed may lead to an increase in a carbon component contained in organic substances such as resins forming the electronic and electrical device component scrap, which may cause troubles due to over-reduction in the smelting furnace. On the other hand, since the amount of the electronic and electrical device component scrap processed tends to be increased in recent years, there is a need for efficient processing in the copper smelting flash furnace.

As one of methods for preventing the generation of troubles due to over-reduction in the copper smelting flash furnace, it is proposed that the electronic and electrical device component scrap is crushed before processing of the electronic and electrical device component scrap in a copper smelting flash furnace to reduce the volume. For example, Japanese Patent Application Publication No. 2015-123418 A (Patent Literature 2) discloses that electrical and electronic device component scrap containing copper is incinerated and then crushed to have a predetermined size or less, and the crushed electrical and electronic device component scrap is processed in a copper smelting furnace.

CITATION LIST

Patent Literatures

[Patent Literature 1] Japanese Patent Application Publication No. H09-78151 A
[Patent Literature 2] Japanese Patent Application Publication No. 2015-123418 A

SUMMARY OF THE INVENTION

However, an increased amount of smelting inhibitors introduced into the copper smelting step due to the increased amount of electronic and electrical device component scrap to be processed arises a situation where an amount of the electronic and electrical device component scrap to be introduced has to be limited.

Therefore, it is desirable for the raw materials introduced to the smelting step to decrease the smelting inhibitor content as much as possible and to have higher contents of valuable metals. However, depending on the type of electronic and electric device component scrap, a sorting efficiency of the sorting step for sorting the raw materials to be fed into the smelting step may be reduced due to contamination of substances that significantly reduce a sorting capacity of a sorter used in the sorting step, resulting in larger losses of valuable metals.

In view of the above problems, the present invention provides a method for processing electronic and electrical device component scrap, which can improve an efficiency of sorting of raw materials fed to the smelting step from electronic and electrical device component scrap, and reduce losses of valuable metals.

As a result of intensive studies to solve the above problems, the present inventors have found that it is effective to remove powdery objects contained in electronic and electrical device component scrap prior to a step of separating non-metal objects or metal objects from the electronic and electrical device component scrap containing the metal objects and the non-metal objects, using a metal sorter including: a metal sensor, a color camera, an air valve, and a conveyor.

In one aspect, the present invention completed on the basis of the above findings provide a method for processing electronic and electrical device component scrap, including removing powdery objects contained in electronic and electrical device component scrap prior to a step of separating non-metal objects or metal objects from the electronic and electrical device component scrap containing the metal objects and the non-metal objects, using a metal sorter including: a metal sensor, a color camera, an air valve, and a conveyor.

According to the present invention, it is possible to provide a method for processing electronic and electrical device component scrap, which can improve an efficiency of sorting of raw materials fed to the smelting step from electronic and electrical device component scrap, and reduce losses of valuable metals.

DETAILED DESCRIPTION OF THE INVENTION

As used herein, the "electronic and electrical device component scrap" refers to scrap obtained by crushing electronic and electrical devices such as waste home electric appliances, PCs, and mobile phones, recovering them and then crushing them to have an appropriate size. In the present embodiment, the crushing for obtaining the electronic and electrical device component scrap may be performed by an operator. However, crushed objects may be purchased on the market.

The crushing method is carried out by any apparatus that is not limited to a specific apparatus, and may be carried out in sharing or shock manner. It is desirable to carry out crushing such that the shapes of the components are maintained as much as possible. Therefore, the apparatus does not include one belonging to the category of a crusher for the purpose of fine crashing.

The electronic and electrical device component scrap is preferably separated into individual components in the form of circuit boards (substrates), wire scrap, parts such as ICs and connectors, metals, and synthetic resins (plastics) used for casings and the like, by coarse crushing in advance. This can provide easy sorting of particular individual components with a metal sorter 10 as described below, thereby improving a sorting efficiency.

The electronic and electrical device component scrap introduced into a metal sorter 10 is preferably crushed to have a maximum particle diameter of about 100 mm or less, further about 50 mm or less, and has a characteristic particle diameter of from about 4 to 70 mm, or from about 4 to 50 mm. The "characteristic particle diameter" as used herein refers to an average value obtained by extracting arbitrary 100 pieces from the electronic and electrical device component scrap, calculating an average value of long diameters of the extracted electronic and electrical device component scrap, and repeating this procedure five times.

—Metal Sorter 10—

Figure 1:
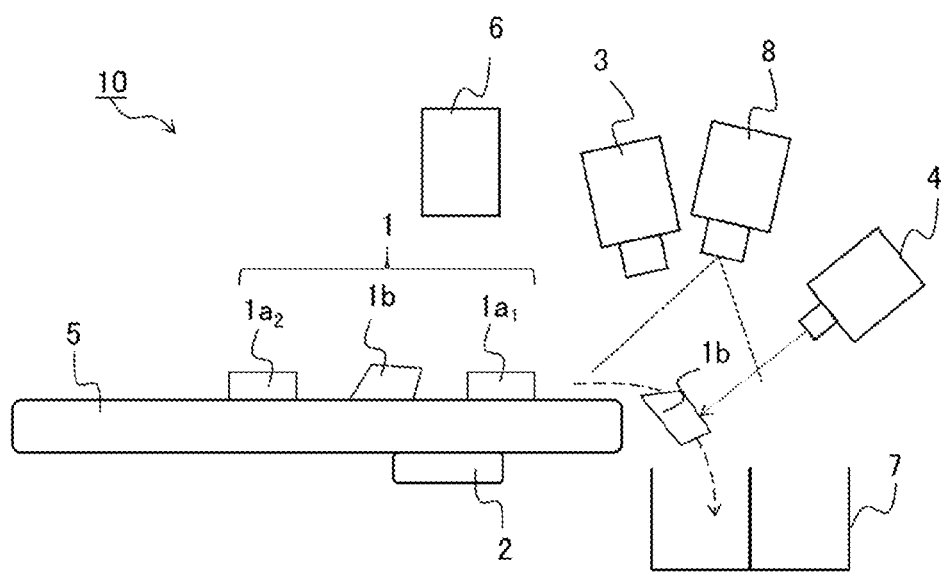
FIG. 1 is a schematic view of a sorter used in a method for processing electronic and electrical device component scrap according to an embodiment of the present invention.

FIG. 1 is a schematic view illustrating an example of a metal sorter according to an embodiment of the present invention. The present embodiment may separate non-metal objects $1b$ or metal objects $1a_1$, $1a_2$ from the electronic and electrical device component scrap 1 containing at least the metal objects $1a_1$, $1a_2$ and the non-metal objects $1b$, for example using a metal sorter 10 as shown in FIG. 1. It should be understood that that FIG. 1 is merely illustrative, and the positions of the members and the positional relationship between the members are, of course, not limited to the example of FIG. 1.

The metal sorter 10 includes: a metal sensor 2; a color camera 3; an air valve 4; and a conveyor 5. Provided in the vicinity of the color camera 3 is a color camera lighting device 8 for illuminating a field of view of the color camera 3. A near-infrared sensor 6 may be further provided at a position facing the metal sensor 2 across the conveyor 5, in order to improve a detection efficiency.

The metal sensor 2 of the metal sorter 10 detects the metal objects $1a_1$, $1a_2$ on the conveyor 5. The conveyor 5 then conveys and releases the metal objects $1a_1$, $1a_2$ and the non-metal objects $1b$, and the color camera 3 arranged on the downstream side of the metal sensor 2 in the conveying direction receives light reflected by the metal objects $1a_1$, $1a_2$ and the non-metal objects $1b$ struck by light emitted from the color camera lighting device 8 toward the optical detection position of the color camera 3 on a falling trajectory of the metal objects $1a_1$, $1a_2$ and the non-metal objects $1b$. Immediately after that, information of an area where the metal objects $1a_1$, $1a_2$ that has been recognized by the metal sensor 2 are not present and positional information where the metal objects $1a_1$, $1a_2$ and the non-metal objects $1b$ that have been detected by the color camera are present are combined, whereby a determination means (not shown) of the metal sorter 10 determines the positions of the non-metal objects $1b$. Subsequently, based on the determination information of the non-metal objects $1b$, the air valve 4 arranged on the downstream side of the optical detection position of the color camera 3 blows air to the non-metal objects $1b$ to shoot down the non-metal objects $1b$, so that the non-metal objects $1b$ and the metal objects $1a_1$, $1a_2$ will be housed in separate sorting containers 7, respectively.

As the metal sensor 2, a general-purpose sensor for detecting metals can be employed. For example, a sensor for detecting metals using electromagnetic induction can be preferably used. Specifically, the metal sensor 2 including one or more electromagnetic induction coils (not shown) can be used, and the detection range of the metal sensor 2 can be changed depending on the sizes of the electromagnetic induction coils.

Figure 2:
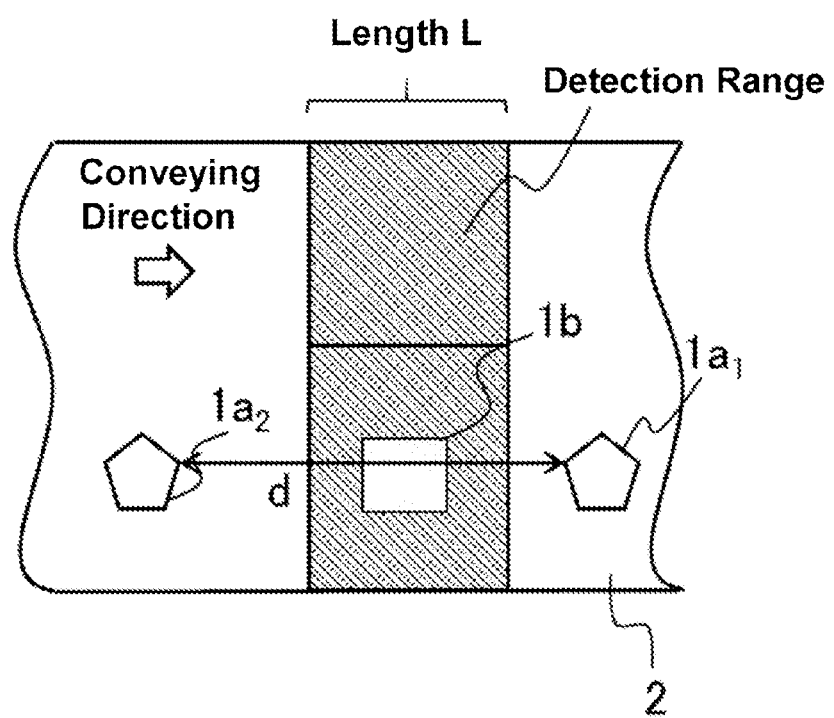
FIG. 2 is an explanatory view showing a mode where erroneous detection does not occur when a metal sorter detects metal objects in electronic and electrical device component scrap.

FIG. 2 shows a schematic view illustrating a positional relationship between the detection range of the metal sensor 2 and the electronic and electrical device component scrap 1. The detection range of the metal sensor 2 has a width that is equal to that of the conveyor 5 (in an up-down direction on the paper surface of FIG. 2), and has a length L along a moving direction of the conveyor 5, i.e., the conveying direction of the electronic and electrical device component scrap 1.

In the sorting of the metal objects $1a_1$, $1a_2$ and the non-metal objects $1b$ contained in the electronic and electrical device component scrap 1, the non-metal object $1b$ sandwiched between the metal objects $1a_1$, $1a_2$ may not be recognized as the non-metal objects $1b$ and may not be shot down by the air valve 4, when the non-metal object $1b$ is present between the metal objects $1a_1$ and the metal object $1a_2$, as shown in FIG. 2. This would be because when a distance between the metal object $1a_1$ and the metal object $1a_2$ adjacent to each other is too short, the metal object $1a_1$ and the metal object $1a_2$ are recognized as one metal object, so that the non-metal object $1b$ between the metal object $1_{a1}$ and the metal object $1a_1$ are not recognized as the non-metal $1b$.

In the present embodiment, when the metal objects $1a_1$, $1a_2$ in the electronic and electrical device component scrap 1 is detected by the metal sensor 1, a fixed distance d (the shortest distance) is preferably at least provided between the metal object $1a_1$ and the metal object $1a_2$ adjacent to each other, so as to prevent the non-metal object $1b$ present between the metal object $1a_1$ and the metal object $1a_2$ adjacent to each other being form erroneously detected.

Specifically, as shown in FIG. 2, when the metal objects $1a_1$, $1a_2$ in the electronic and electrical device component scrap 1 is detected by the metal sensor 1, the positions of the metal objects $1a_1$, $1a_2$ are preferably adjusted such that the distance d between the metal object $1a_1$ and the metal object $1a_2$ with at least the non-metal object sandwiched between the metal object $1a_1$ and the metal object $1a_2$ is larger than the length L of the detection range of the metal sensor. This can allow the metal sensor 2 to recognize the metal object $1a_1$ and the metal object $1a_2$ as separate metal objects $1a_1$, $1a_2$, respectively, so that erroneous detection by the metal sensor 2 can be suppressed and the separation efficiency of the non-metal object $1b$ present between the metal objects $1a_1$, $1a_2$ can be further improved. Even if the non-metal object $1b$ is not present between the metal object $1a_1$ and the metal object $1a_2$, the fixed distance can be provided between the metal object $1a_1$ and the metal object $1a_2$ such that the fixed distance is larger than, specifically, the length L of the detection range of the metal sensor, so that a sorting efficiency between the metal objects $1a_1$, $1a_2$ and the non-metal objects $1b$ can be improved.

Figure 3:
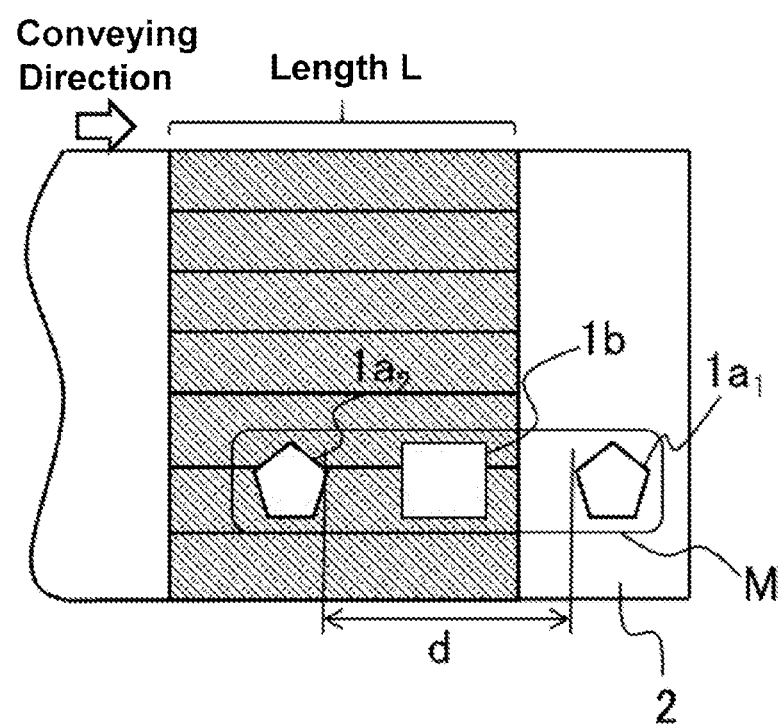
FIG. 3 is an explanatory view showing a mode where erroneous detection may occur when a metal sorter detects metal objects in electronic and electrical device component scrap.

On the other hand, if the distance d between the metal object $1a_1$ and the metal object $1a_2$ is equal to or less than the length L of the detection range of the metal sensor 2 as shown in FIG. 3, the metal sensor 2 may recognize the non-metal object 1b and the metal objects $1a_1$, $1a_2$ as single metal object M as a whole, whereby the non-metal object 1b may not be recognized as a foreign matter and the non-metal object 1b may not be separated.

The length L of the metal sensor 2 belongs to the device and is not particularly limited. However, since the characteristic particle diameter of the electronic and electrical device component scrap targeted by the present invention is typically from 4 to 70 mm or less, the length L may preferably be from 4 mm to 200 mm, and more preferably from 20 mm to 60 mm. Since the air valve 4 continues to blow air while the non-metal objects are flowing, the number of the air blowing is relatively low if the length L is equivalent to the size of the non-metal object in the electronic and electrical device component scrap, while the number of air blowing will be very high if the length L is too small, so that the air may be lacked during operation. Therefore, it is necessary to increase the capacity of a compressor in order to prevent the lack of air. Accordingly, the length L is preferably selected according to the size of the non-metal object in the electronic and electrical device component scrap.

In order to separate the metal objects $1a_1$, $1a_2$ and the non-metal object 1b from each other to the extent that erroneous detection of the metal sensor 2 can be suppressed, it is preferable that the metal objects $1a_1$, $1a_2$ and the non-metal objects 1b are previously dispersed on the conveyer 5, such as by vibrating the conveyor 5.

A delivery speed of the conveyor 5 is 3 m/s in a fixed manner, but it may be in a variable manner. For example, it may vary between 1 and 5 m/s depending on the situations.

Even if the metal objects $1a_1$, $1a_2$ could be correctly detected by the metal sensor 2 and the position information of the non-metal objects 1b could be correctly recognized by the color camera, it would be difficult to shoot down the non-metal objects 1b to an appropriate position if an opening/closing speed of the air valve 4 is not properly adjusted. In this embodiment, the opening/closing speed of the air valve 4 is preferably from 0.5 to 4 ms/cycle, and more preferably from 2 to 4 ms/cycle.

According to the method for processing the electronic and electrical device component scrap 1 according to the embodiment of the present invention, the metal sorter 10 can effectively sort the metal objects $1a_1$, $1a_2$ including valuable metal-handling substrates containing a large amount of metal components such as wirings and leads on the surface or in the interior, and the non-metal objects 1b including the resin-handling substrates containing no metal or containing a trace amount of metal on the surface or in the interior.

Since the substrates containing valuable metals such as copper and precious metals are concentrated in the sorted metal objects $1a_1$, $1a_2$, the sorted objects including the metal objects $1a_1$, $1a_2$ can be processed as processing objects in a smelting step to improve a recovery efficiency of valuable metals. On the other hand, since the separated objects separated as the non-metal objects 1b include the resin-handling substrates containing Sb that is a smelting inhibitor, substances that will inhibit the processing in the smelting step are prevented from being contaminated into the smelting step, so that a processing efficiency in the smelting process can be improved.

(Wind Power Sorting)

Continuous processing using the metal sorter 10 as described above can allow efficient mechanical concentration of substrates that contain larger amounts of valuable metals from the electronic and electrical device component scrap, thereby improving a recovery efficiency of valuable metals while suppressing the contamination of the smelting inhibitors as compared with the conventional physical sorting step.

However, the continuous processing of a large amount of electronic and electric device component scrap 1 leads to flying-up of powdery objects contained in the electronic and electric device component scrap 1 in the metal sorter 10 to adhere to peripheral equipment such as the color camera 3, the air valve 4, the near-infrared sensor 6, and the color camera lighting device 8, which causes a problem of malfunction (erroneous detection) of the metal sorter or troubles of the metal sorter 10.

Therefore, in the present embodiment, a step of removing powdery objects is carried out before the separation step of separating the metal objects $1a_1$, $1a_2$ or the non-metal object 1b from the electronic and electrical device component scrap 1 containing the metal object $1a_1$, $1a_2$ and the non-metal object 1b, using the metal sorter 10. This can allow the ratio of the powdery objects in the electronic and electrical device component scrap 1 fed into the metal sorter 10 to be reduced to suppress a decrease in recognition accuracy and sorting accuracy of the metal sorter 10, or erroneous recognition of the color camera 3 due to the flying-up of the powdery objects, so that the sorting efficiency of the metal sorter 10 can be improved.

As a result of the continuous operation of the metal sorter 10, it was found that one of the causes of the decrease in the recognition accuracy and the sorting accuracy of the metal sorter 10 is that the powdery objects having a particle size of 5 mm or less enter the metal sorter 10. In the present embodiment, it is preferable to remove the powdery objects having a particle size of 3 mm or less, and in another embodiment, the powdery objects having a particle size of 2 mm or less, toward the light weight object side by the wind power sorting process. The "particle size" of the powdery objects refers to a median diameter of the powdery objects measured by a commercially available laser diffraction type particle size distribution measuring device.

It is desirable that an amount of the powdery objects after the step of removing the powdery objects contained in the electronic and electrical device component scrap is 1% by mass with respect to the total amount of the electronic and electrical device component scrap before that step.

As a specific method for removing the powdery objects, wind power sorting or sieve sorting is effective. In the wind power sorting, the powdery objects are sorted as light weight objects. However, if its wind velocity is too high, other component scrap such as aluminum pieces is also separated as the light weight objects. Therefore, if it is desired to selectively and efficiently separate only the powdery objects, an excessively high wind velocity is not desirable. Therefore, to achieve more efficient feeding of the powdery objects contained in the electronic and electrical device component scrap to the light weight object side by the wind power sorting, the wind power sorting is preferably carried out at a wind velocity of from 5.0 to 8.0 m/s, and more preferably from 6.0 to 7.0 m/s, as a condition for the wind power sorting.

If it is desired to further sort objects other than the powdery objects by the wind power sorting, the wind power sorting can be carried out in at least two stages. For example, it is possible to combine a first wind sorting process for previously separating the powdery objects that will be affected on the failure of the metal sorter 10 with a second wind sorting process for concentrating the substrates fed to the metal sorter 10 and separating metals including Fe, Al, and the like. The second wind power sorting process for separating precious metal-containing objects such as substrates and ICs and metals including Fe, Al, and the like, from the electronic and electrical device component scrap 1 is preferably carried out at a wind velocity of from 10 to 18 m/s, or even from 15 to 18 m/s. In order to improve the concentration of capacitors and the fraction of metals, an optimum wind velocity is preferably from 5 to 15 m/s, of even from 8 to 12 m/s.

For the sieve sorting, the powdery objects can be separated to a sieved object side if a sieve opening is 2 mm or more. If the sieve opening is too large, it can be adjusted, but other component scrap may be separated under the sieve. Therefore, it is desired to separate only the powdery objects, an excessive large sieve opening is not desirable. Therefore, the sieve opening is preferably from 2 mm to 5 mm. Further, if it is desired to remove wire-shaped scrap by the sieve sorting, a slit sieve is preferable, and it is also possible to remove the powdery objects together in this step.

The wind power sorting or sieving process for removing the powdery objects may be carried out immediately before the processing with the metal sorter 10, or prior to this processing, it may be carried out in combination with any sorting stage. For example, the wind power sorting may be carried out on the electronic and electrical device component scrap 1 immediately after at least one of the crushing, sieving, magnetic sorting, or color sorting processes that take place prior to the processing using the metal sorter 10, and the separation step may be then carried out using the metal sorter 10.

Alternatively, in any stage for roughly crushing the electronic and electrical devices such as the waste home appliances, PCs, and mobile phones as described above, which will be raw materials for the electronic and electrical device component scrap 1 to obtain a processing material, the wind power sorting process or the sieving process may be carried out to remove the wire-shaped objects, which can also be included in the embodiment according to the present invention.

(Variation)

The electronic and electrical device component scrap 1 is further subjected to a certain pre-processing prior to the processing by the metal sorter 10 according to the present embodiment, so that the sorting efficiency of the metal objects $1a_1$, $1a_2$ and the non-metal objects $1b$ in the electronic and electrical device component scrap 1 can be further improved.

For example, the sorting efficiency of the metal objects $1a_1$, $1a_2$ and the non-metal objects $1b$ can be improved by adjusting a number ratio (metal object/non-metal object) of the metal objects $1a_1$, $1a_2$ to the non-metal objects $1b$ contained in the electronic and electrical device component scrap 1 so as to be 2.0 or less, or even 1.6 or less, or even 1.3 or less, before detecting the metal objects $1a_1$, $1a_2$ in the electronic and electrical device component scrap 1 by the metal sensor 2. The adjustment can be efficiently carried out, for example, by using a color sorter provided with at least two camera units that can distinguish colors of both front and back sides of the processing object to sort substrate scrap in the electronic and electrical device component scrap.

Thus, the present invention is not limited to each embodiment, and the components may be modified and embodied without departing from the spirit of the present invention. Further, various inventions may be created by appropriately combining the plurality of components disclosed in the present embodiment. For example, some components may be removed from all the components shown in the embodiments, or the components of different embodiments may be optionally combined.

DESCRIPTION OF REFERENCE NUMERALS

1 electronic and electrical device component scrap
1b non-metal object
$1a_1$, $1a_2$ metal object
2 metal sensor
3 color camera
4 air valve
5 conveyor
6 near-infrared sensor
7 sorter
8 color camera lighting device
10 metal sorter

The invention claimed is:

1. A method for processing electronic and electrical device component scrap, comprising removing powdery objects contained in electronic, and electrical device component scrap prior to a step of separating non-metal objects from the electronic and electrical device component scrap containing metal objects and the non-metal objects, using a metal sorter comprising: a metal sensor, a color camera, an air valve, and a conveyor, wherein the step of separating non-metal objects comprises:
   determining area information as to where the metal objects are not present with the metal sensor;
   determining positional information as to where the metal objects and the non-metal objects are present with the color camera; and
   separating the non-metal objects by blowing air from the air valve onto the non-metal objects.

2. The method for processing electronic and electrical device component scrap according to claim 1, wherein the powdery objects have a particle size of 5 mm or less.

3. The method for processing electronic and electrical device component scrap according to claim 1, wherein an amount of the powdery objects after the step of removing the powdery objects contained in the electronic and electrical device component scrap is 1% or less by mass with respect to the total amount of the electronic and electrical device component scrap before the step of removing the powdery objects.

4. The method for processing electronic and electrical device component scrap according to claim 1, wherein the removing of the powdery objects comprises using either wind power sorting or sieving sorting.

5. The method for processing electronic and electrical device component scrap according to claim 4, wherein the wind power sorting is carried out at a wind velocity of from 5 to 8 m/s.

6. The method for processing electronic and electrical device component scrap according to claim 4, wherein the sieve sorting is carried out at a mesh opening of from 2 to 5 mm.

7. The method for processing electronic and electrical device compo ent scrap according to claim 1, wherein the method comprises removing the powdery objects contained in the electronic and electrical device component scrap immediately after at least one of crushing, sieving, magnetic sorting, or color sorting.

8. The method according to claim 1, further comprising adjusting positions of metal objects sandwiching the non-metal object so as to have a distance between the metal objects larger than a length of a detection range before detection by the metal sorter.

9. The method according to claim 1, wherein the metal sensor is provided with the conveyer and the color camera is provided above the conveyor.

* * * * *